(12) United States Patent
Rhoads et al.

(10) Patent No.: US 6,516,079 B1
(45) Date of Patent: Feb. 4, 2003

(54) DIGITAL WATERMARK SCREENING AND DETECTING STRATEGIES

(75) Inventors: Geoffrey B. Rhoads, West Linn, OR (US); Ravi K. Sharma, Hillsboro, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 09/526,982

(22) Filed: Mar. 15, 2000

Related U.S. Application Data

(63) Continuation-in-part of application No. 09/503,881, filed on Feb. 14, 2000.

(51) Int. Cl.$^7$ ................................................ G06K 9/00
(52) U.S. Cl. ................................................ 382/100
(58) Field of Search ................................ 382/100, 190, 382/195, 206, 209, 219, 220, 221, 224, 229, 232, 233, 235, 276, 278, 280, 286, 287; 713/155, 160, 161, 162, 168, 176, 179, 180, 181, 187, 189; 380/200, 250, 252, 253, 254, 277, 56; 340/825.34; 348/465, 604

(56) References Cited

U.S. PATENT DOCUMENTS

| | | | | |
|---|---|---|---|---|
| 5,664,018 A | * | 9/1997 | Leighton | 380/54 |
| 5,825,892 A | * | 10/1998 | Braudaway et al. | 380/51 |
| 5,835,639 A | * | 11/1998 | Honsinger et al. | 382/278 |
| 5,875,249 A | * | 2/1999 | Mintzer et al. | 380/54 |
| 5,940,134 A | * | 8/1999 | Wirtz | 348/473 |
| 6,024,287 A | * | 2/2000 | Takai et al. | 235/493 |
| 6,064,764 A | * | 5/2000 | Bhaskaran et al. | 382/183 |
| 6,111,990 A | * | 8/2000 | Sugaya et al. | 382/250 |
| 6,198,832 B1 | * | 3/2001 | Maes et al. | 382/100 |
| 6,209,092 B1 | * | 3/2001 | Linnartz | 713/176 |
| 6,209,094 B1 | * | 3/2001 | Levine et al. | 713/176 |
| 6,216,228 B1 | * | 4/2001 | Chapman et al. | 713/176 |

\* cited by examiner

*Primary Examiner*—Andrew W. Johns
*Assistant Examiner*—Shervin Nakhjavan
(74) *Attorney, Agent, or Firm*—Joel R. Meyer; Digimarc Corporation

(57) ABSTRACT

To enhance decoding of signals suspected of containing a watermark, a suspect signal is screened to compute detection values evincing presence and strength of a watermark. Screening strategies control detector actions, such as rejecting un-marked signals and improving synchronization of watermarks in suspect signals.

37 Claims, 3 Drawing Sheets

DIGITAL WATERMARK SCREENING AND DETECTING STRATEGIES

RELATED APPLICATION DATA

This patent application is a continuation-in-part of application Ser. No. 09/503,881, filed Feb. 14, 2000.

TECHNICAL FIELD

The invention relates to digital watermarking, and more particularly relates to watermark detection in multimedia content (e.g., still image, video and audio signals).

BACKGROUND AND SUMMARY

The reader is presumed to be familiar with digital watermarking technology. See, e.g., co-pending application Ser. No. 09/503,881, filed Feb. 14, 2000, entitled Watermark Reader and Embedder, the disclosure of which is incorporated by reference.

One objective of watermark detectors is to reject unmarked signals (e.g., image, audio, video signals) at the earliest possible stage of detection. The detector may conclude that a signal is unmarked based on quantitative evidence of the watermark (or lack thereof) in a signal suspected of having a watermark. The signal might be an unmarked component of a marked signal, or simply an unmarked signal. Also, in some cases, the signal, though previously marked, may appear to be unmarked due to removal or degradation of the watermark. By accurately identifying an unmarked signal at an early stage, the detector can avoid unnecessary processing. Also, the apparent absence of a watermark may trigger some action (or prevent an action) such as providing output indicating that the signal has been tampered with or controlling processing of the signal (e.g., preventing copying, playing or recording in copy protection applications).

A related objective of a watermark detector is measuring the strength of a watermark signal. Based on the watermark strength, the detector can assess whether a suspect signal has a valid watermark, and the extent to which a signal has been transformed. The detector can also determine the likelihood that a suspect signal includes a valid watermark or recoverable watermark message. Such an evaluation helps the detector allocate its processing resources on portions of the suspect signal that are likely to contain a valid watermark or recoverable watermark message.

The cited application describes a variety of techniques for detecting a watermark. Some of these techniques correlate attributes of a watermark signal with a signal suspected of containing a watermark. By measuring the extent of correlation, a watermark detector assesses whether a watermark is present, and in some cases, determines its orientation in the suspect signal. Related techniques detect a watermark signal by at least partially decoding a message from the suspect signal and then comparing attributes of the message with expected attributes to assess the likelihood that a watermark signal is present. These and other techniques may be used to compute a detection value that quantifies the likelihood that the suspect signal has a watermark.

One aspect of the invention is a method of using detection values ascertained from signals suspected of being watermarked to control the detection process. The detection values may be used to reject unmarked signals. In addition, they may be used to refine the detection process by focusing the detector on signals or portions of signals that are likely to contain a watermark and/or a recoverable watermark message. Each portion of a suspect signal may be defined by an orientation parameter (or set of parameters like rotation, scale, origin, shear, differential scale, etc.). Also, each portion may represent different orientations of the suspect signal, or a component of the signal.

Another aspect of the invention is a method for using two or more detection metrics to control the detection process. The multiple metrics could be derived from independent measurements in multiple stages or could be different features of the same measurement. Each detection metric evaluates detection values to control detection actions. One type of detection metric is a screen used to evaluate suspect signals or portions of a suspect signal for the presence of a watermark. Each stage evaluates detection values to assess whether a suspect signal, or portion of it, is marked.

Another aspect of the invention is a method for using absolute and relative detection measures to assess whether a suspect signal is marked. An absolute measure of detection represents quantitative evidence of a watermark signal in a suspect signal, and is usually evaluated independently from other detection values. A relative measure is based on the relative values of two or more detection values, which may be relative or absolute measures. A relative measure may be implemented by computing absolute detection values for different portions of a suspect signal and then computing a relative detection value as a function of the absolute detection values.

Both absolute and relative detection values may be evaluated relative to desired limits or thresholds to determine an appropriate action. One action is to reject the candidate signal associated with the detection value as being unmarked. Another action is to use the detection values to direct further actions of the detector. One advantage of using both absolute and relative detection values is that they usually contain complementary information. This complementary information helps in improving the watermark screening and detection process.

In one implementation, a detector computes detection values for different orientation parameter candidates, sorts the detection values in terms of likelihood of representing a valid watermark, and then takes a ratio of a top detection value relative to one or more lesser detection values. The orientation parameter candidates define an approximate orientation and/or location of a watermark in a suspect signal, and as such are associated with a portion of a suspect signal.

The foregoing and additional features and advantages of the present invention will be more readily apparent from the following detailed description, which proceeds with reference to the accompanying drawings.

DETAILED DESCRIPTION

Figure 1:
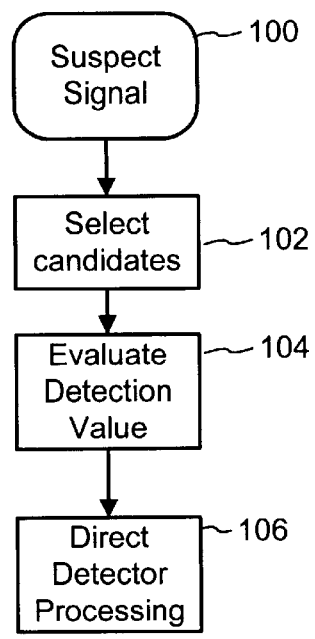
FIG. 1 is a flow diagram illustrating a watermark detection process.

A watermark decoder detects a watermark in a suspect signal by computing evidence of watermark signal attributes in the suspect signal. The watermark signal attributes used in detection may be referred to as a calibration or synchronization signal (hereafter referred to as "calibration signal"). The calibration signal may be watermark signal attributes that correspond to message symbols embedded in a watermark. For example, a watermark message may include a "signature" of one or more symbols known to the decoder. In the process of encoding the signature, a watermark encoder modifies a host media signal to compute a composite signal with signal attributes of the signature. To detect the watermark in a suspect signal, a detector analyzes the suspect signal to find evidence of the signature. In this case, the calibration signal corresponds to the attributes of the composite signal used to encode the signature.

The calibration signal may also be an orientation watermark. To encode the orientation mark, the watermark encoder modifies the host signal to compute a composite signal with signal attributes of the orientation signal. To detect the watermark, a detector analyzes a suspect signal to find evidence of the orientation signal. In, this case, the calibration signal corresponds to the orientation signal. Both a message signature and an orientation signal may be embedded in a host signal. Some watermark signals may perform a dual function of encoding a signature and an orientation signal (e.g., a watermark signal acts as a signature and an orientation signal).

The following description uses the term "calibration signal" to broadly encompass watermark signal attributes used to identify a watermark in a suspect signal. Unless specified otherwise, the calibration signal should be construed to encompass watermark message symbols and/or an orientation signal used to detect a watermark.

To detect a watermark in a suspect signal, a detector computes quantitative evidence of the calibration signal. One form of evidence is a detection value indicating the extent to which a portion of the suspect signal has attributes that match those of the calibration signal. One such measure is a correlation value that quantifies the correlation between the calibration signal and a portion of the suspect signal. Another measure is the extent to which the known signature matches a signature computed from the suspect signal.

In the process of detecting a watermark in a suspect signal, the detector may analyze several portions of the suspect signal. In many watermark systems, a key specifies where a watermark is located in an un-modified watermarked signal. However, the decoder does not know whether there is a watermark in a suspect signal. Moreover, transformation of the composite signal may degrade the watermark and alter its orientation in a suspect signal. For many applications, the detector must search for the presence of a watermark and determine its orientation. This process is sometimes referred to as synchronization.

The synchronization process varies depending on the type of host and watermark signal. In images, the orientation of the watermark may change due to transformations of the host image (e.g., geometric transforms, spatial frequency transforms, phase transforms etc.). In audio, the location of the watermark may also change due to transformations (e.g., temporal shifting or scaling due to up-sampling or down-sampling, frequency shifting, phase shifting, etc.). In video signals, the location of the watermark may change due to these and other transformations.

Because these transforms may alter a watermark, the detector analyzes several different portions of the suspect signal to find evidence of it. A watermark key may help guide the analysis around certain portions of the suspect signal. Each of these portions has one or more orientation parameters that define a location (and/or orientation) in the suspect signal. In an audio sequence, the portion might be a time window or range of frequencies within an audio segment. In an image, the portion may be a two-dimensional spatial area or range of frequencies. To simplify the discussion, these portions of the suspect signal and their corresponding orientation parameter (or parameters) are generally referred to as candidates. The detector may compute a detection value for each candidate. Then, based on these detection values, the detector may assess whether a watermark is present, and the strength of the watermark.

FIG. 1 illustrates a process for detecting a watermark in a suspect signal. The detector identifies candidates in the suspect signal (100, 102). A watermark key may be used to locate the candidates. Used in the watermark encoder to embed the calibration signal, the key generally specifies the location of the calibration signal in an unmodified marked signal. The detector then computes a detection value for the candidates (104). Next, it determines how to direct further detector actions based on the detection values (106). The detection value may be an absolute measure derived from a single candidate. Alternatively, it may be relative measure, computed by evaluating the detection value of one or more candidates relative to other candidates.

The detector may implement different actions based on evaluation of the detection values. One action is to reject the suspect signal as being un-marked. Another action is to use the detection measures to refine initial detection results. One way to refine the initial detection result is to select additional candidates that may increase the likelihood of accurate detection of a watermark and/or recovery of a message embedded in it. In short, the detector may use the detection values to focus detector resources on portions of the suspect signal that show promising evidence of a watermark and/or its calibration signal.

EXAMPLE EMBODIMENTS

Figure 2:
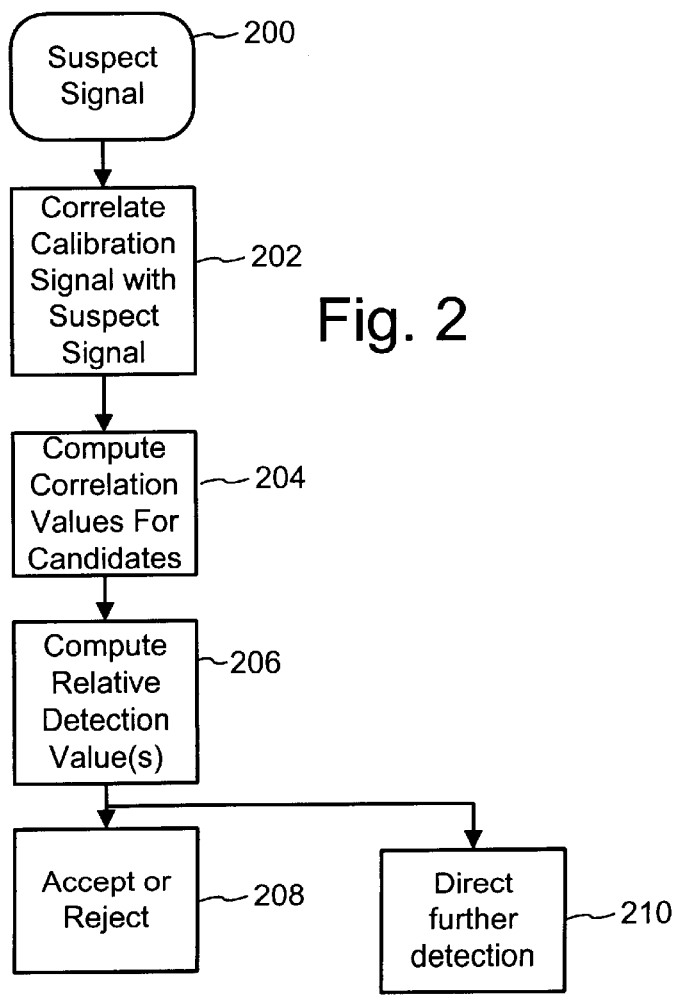
FIG. 2 is a flow diagram showing a watermark detector that correlates a calibration signal with a suspect signal to compute detection values.

FIG. 2 illustrates an example embodiment of a watermark detector that uses detection values to reject unmarked signals and to direct further detection actions. In this example, the detector correlates the calibration signal (or attributes of it) with the suspect signal (200, 202). In performing the correlation process, the detector may use a watermark key to select initial portions of the suspect signal expected to contain a watermark. For example, the key may specify that the calibration signal has been encoded into marked signals in a particular spatial or temporal location in some given transform domain.

The correlation process (202) computes correlation values for candidate portions of the suspect signal that exhibit some evidence of the calibration signal (204). A variety of correlation methods may be employed, including, for example general matched filtering. Each candidate may be defined by one or more orientation parameters that describe its location and orientation within the suspect signal. The correlation values for each candidate are absolute detection values.

Next, the detector computes relative detection values based on the detection values calculated previously from the suspect signal (206). One example of a relative detection value is a ratio of a top absolute detection value to one or more lesser detection values. The detection process may repeat, iteratively refining candidates by adjusting their orientation parameters. In this case, there may be several sets of absolute detection values, and corresponding relative detection values for each set.

After the detector has computed detection values, it uses those values to control further detection actions. One action is to screen and reject un-marked signals (including un-marked portions of a signal, or portions where a watermark has been degraded) (208). Another action is to use promising detection values (e.g., those values falling within a desired range or exceeding a limit) to direct further detection operations on the suspect signal (210). The cited application provides an example of this action where orientation parameter candidates associated with top detection values are refined to improve detection and watermark message recovery. These types of actions can be used in detectors for different types of signals, including still image, audio and video signals.

Figure 3:
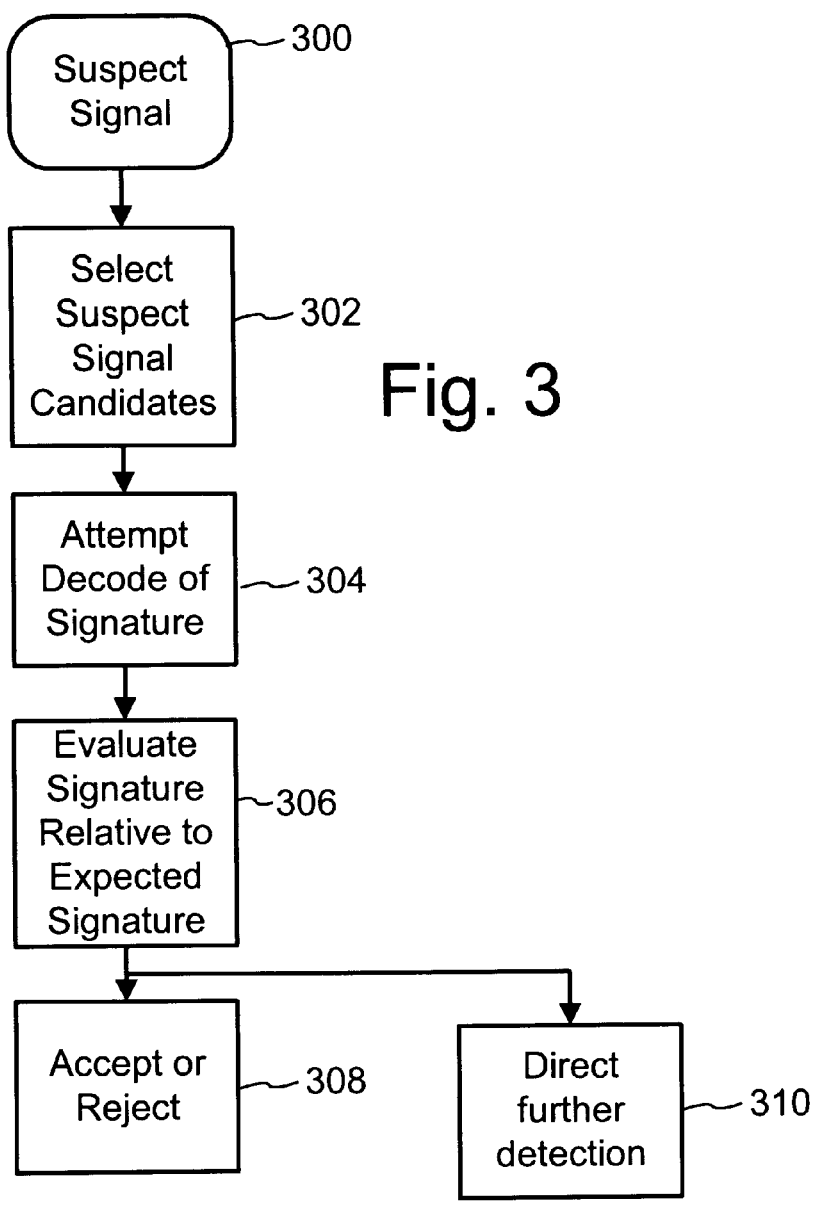
FIG. 3 is a flow diagram showing a watermark detector that computes detection values by comparing an expected signature with a watermark signature taken from a suspect signal.

FIG. 3 illustrates an example embodiment of a watermark detector in which the calibration signal is in the form of a signature. In this example, the detector begins by evaluating candidates in the suspect signal (300). As in the prior example, a watermark key may be used to specify an initial candidate location of a calibration signal, assuming that the suspect signal has been marked (302). Using the key to identify a candidate location of a: watermark, the detector attempts to decode the signature at the candidate location (304). Even if the suspect signal has been watermarked, the signature may be degraded and/or geometrically transformed due to manipulation of the watermarked signal.

Next, the detector evaluates the decoded signature relative to the signature used in the encoder (the expected signature) (306). One way to evaluate the signature is to measure the similarity between the decoded signature and the expected signature. An example of this similarity measure is the percentage agreement computation in the cited application. The similarity measure is another example of a detection value associated with a particular candidate.

Another way to evaluate the presence of a signature in the suspect signal is to perform correlation between signal attributes of the one or more expected symbols and the suspect signal. In fact, some implementations use correlation to decode watermark message symbols. The extent of correlation provides a measure of similarity between an expected signature and a signature observed in the suspect signal.

Based on the detection value, the detector may reject the signal as being un-marked (308). For example, if the detection value falls below a limit (either predetermined or adapted based on the suspect signal), then the detector may conclude that the associated signal is unmarked.

The detector may also quantify the extent of watermark degradation. For example, a low detection value represents significant degradation, while a high detection value represents minimal degradation. Such detection values are useful in signal authentication or copy control applications where the extent of degradation is used, for example, to determine whether the suspect signal is authentic or to control use of the suspect signal (e.g., enable/prevent its transmission, playback, recording or copying).

The detector may also use the detection value to refine its search for a valid calibration signal (310). For example, when the detection values fall within certain limits, then they direct the detector to focus its attempt to synchronize with the calibration signal around the orientation parameter or parameters that yield such detection values.

The cited application describes methods for computing detection values and using them to direct the actions of the detector. In one implementation, the detector performs multiple stages of detection. One form of calibration signal is an orientation signal. The detector performs correlation between an orientation signal and the suspect signal. Based on the measure of correlation, the detector determines whether to reject the suspect signal. A detection value derived from the correlation is then used to make a decision whether to reject the suspect signal as un-watermarked, or to allow it to proceed to later detection stages.

In a particular implementation in the cited application, an initial detection stage decides whether a watermark is present in a suspect image and, if so, provides estimates of orientation parameters to later detection stages. In other words, the initial detection stage acts as a classifier that discriminates between marked and unmarked images. The initial detection stage computes rotation and scale parameter candidates, and a measure of correlation for these candidates. It then determines whether to reject the suspect signal based on these measures of correlation. One test for screening unmarked signals is to compute a ratio of the top correlation value to other lesser correlation values for the candidates and then reject the signal as unmarked if the ratio does not exceed a limit. If the screen does not reject the suspect image, later detection stages refine the orientation parameter candidates by computing translation parameters (i.e. the origin of the watermark) and/or other parameters such as differential scale and shear.

For the orientation parameter candidate, the detector computes correlation between the orientation signal and the suspect signal. This correlation can be computed in the spatial domain, the Fourier magnitude domain, or some other transform domain.

In some applications, the detection strategy can be improved by performing one or more additional tests on candidates to control further detector processing actions.

One strategy, detailed below, uses a two stage test to reject un-marked images. This strategy uses both absolute and relative detection values. In experiments, this strategy rejects approximately 99% of unmarked images at an initial detection stage.

Ideally, the initial detection stage should allow all watermarked images to proceed to later detection stages but reject all unmarked images. However, any practical classifier would accept some number of unmarked images (false positives) and reject some number of marked images (false negatives). The goal is to minimize both the false positives and the false negatives.

Figure 4:
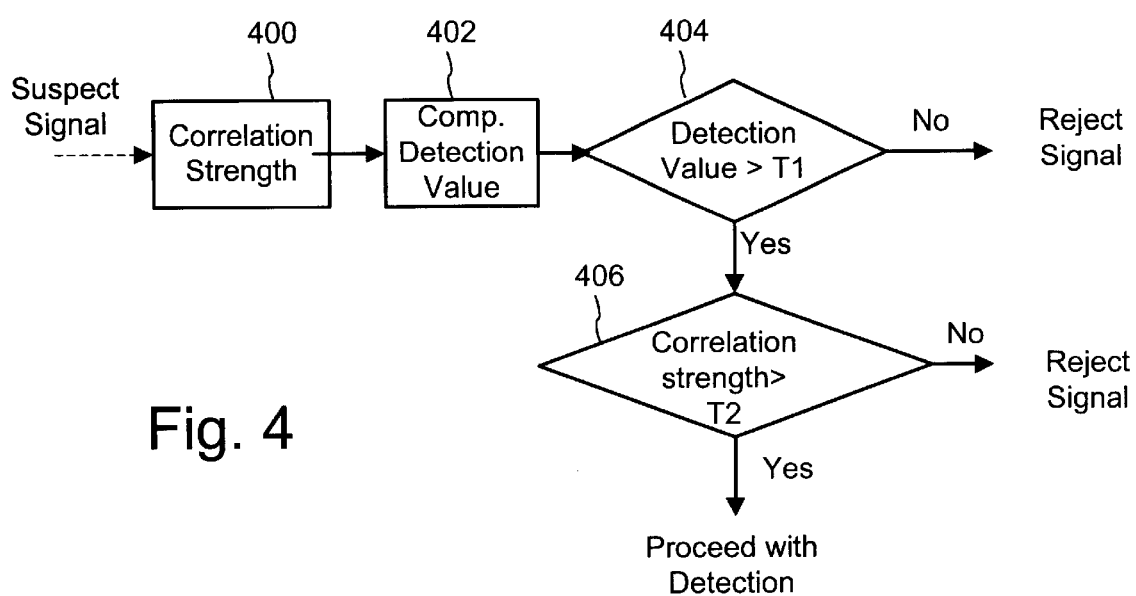
FIG. 4 is a flow diagram of a process for screening un-marked signals based on detection metrics.

FIG. 4 illustrates an example of a screening strategy that achieves this goal. Screen I —This screening strategy uses a detection metric based on relative detection values. Correlation values corresponding to the top candidates are used to compute the relative detection value. In particular, the relative detection value is computed as a ratio of a top correlation value to one or more lesser correlation values or combination of lesser correlation values (e.g., an average of the next N best correlation values). The detection value is compared to a pre-determined threshold T1. If the detection value exceeds T1, the detector proceeds to screen II. If the detection value fails to exceed T1, the suspect image is labeled an unmarked image and further processing ceases.

The correlation value may be computed in a variety of ways, depending on the nature of the orientation and suspect signals. For images, the correlation may be performed in one or more of the following domains: spatial, transform domain (e.g., Fourier domain), etc. In the case where the orientation signal is an array of impulse functions in the Fourier domain, the detector preferably computes the correlation in the Fourier domain. One measure of correlation analyzes the extent to which the impulse functions of the orientation signal are present in the Fourier Magnitude domain. This is a type of correlation strength and is referred to as Fourier Magnitude Correlation (FMC).

One way to compute the correlation strength in this context is to compute the dot product of the impulse functions of the orientation signal and the suspect signal in the Fourier Magnitude domain. The dot product is computed between the two signals after transforming the orientation signal to a candidate orientation (e.g., rotating and scaling it based on rotation and scale parameter candidates).

A related method is to perform an additional filtering process of the samples of the suspect signal in a neighborhood around the location of each impulse function and then summing the result of filtering around each impulse function location. This operating gives an indicator of the extent to which the impulse functions are present in the suspect signal. The neighborhood can be defined in a variety of ways, including a square neighborhood of samples centered at the location of the impulse function, or a neighborhood defined along a line or lines through the impulse function (e.g., horizontal line, vertical line, or radial line through the origin of the coordinate space).

One such filtering operation is to divide the sample in the suspect signal at the impulse location by an average of neighboring samples. If the average value is zero, then the filter result is set to some constant value. In one implementation, the result of filtering at each impulse function location in the Fourier magnitude domain is added to compute a measure of correlation.

A number of variations to this filtering operation are possible. One such variation is to insert a thresholding function before adding the filtering results. One example is a thresholding process that subtracts a first constant from each filtered result, and then clips values greater than a second constant to that constant value. The result of the thresholding operation is summed to derive a measure of correlation strength.

Screen II —In this screen, the correlation strength (corresponding to the top candidate after Fourier magnitude correlation) is compared to a pre-determined threshold T2. If the correlation strength exceeds T2, then the suspect image is allowed to proceed to the later detection stages. If the correlation strength fails to exceed T2, the suspect image is labeled an unmarked image and rejected.

Empirical data shows that for unmarked images, whose correlation strength is high, the remaining correlation values are also comparatively high. Therefore the resulting detection value is low. Screen I is well suited to reject such unmarked images. Most of the unmarked images that do make it beyond Screen I have lower correlation strengths and are rejected by the second step. The combination of the two screens gives high rejection rates.

The correlation strength is a useful figure of merit since it gives an approximate indication of how many orientation signal impulses (out of the total number of impulses in the orientation signal) were detected. Its use as a measure of the strength of the orientation signal can provide a further metric useful in later stages of detection.

A beneficial consequence of high rejection rates at an early detection stage is faster performance (speed of detection). Higher rejection means that the detector can avoid additional processing of later detection stages, which may by more computationally complex. As a result, the mean performance times are reduced.

The following points can be made about this two stage screening:

1) There are two screening stages to reject unmarked images. The first stage uses a metric based on a relative detection value. Images that pass this test are subjected to an additional screen where the correlation strength is compared to a predetermined threshold. Images that do not exceed this threshold are rejected; others proceed to the later detection stages.
2) The improved false positive rate means that the overall false positive statistics (all stages combined) improves commensurately.
3) The reduction in false positives translates into major performance improvements since very few (approximately 1%) of the unmarked images now reach the next stage of detection. In the cited application, additional stages used to refine the orientation parameter candidates (e.g., compute differential scale, shear, translation) and to decode a watermark message can be avoided or can be made more efficient by focusing on candidates that are more likely to represent a valid, recoverable watermark signal.
4) The correlation strength can be used as a figure of merit for the orientation signal.
5) The method can be extended to more than two screens.
6) In some cases, the order of the screens may be important. For example, interchanging the order of Screen I and Screen II may not provide good results. The order can be determined empirically using training data.
7) In each stage of detection, the detector can compute detection values based on one or more features of the suspect signal. Then, using possibly independent detection values front these stages, the detector can combine these values in metrics for screening and refining orientation parameters. Detection values may be considered independent if they are computed independently, rather than derived from each other. For example, a measure of correlation for an orientation signal in a watermark may be independent from a measure of similarity between expected and decoded message symbols from a watermark message.

The detector may compute different measures of correlation in each stage and evaluates a metric that combines information from these correlation measures to get improved rejection of unmarked signals.

The measures of correlation may be different in that they are computed in different domains (e.g., spatial, temporal, transform domains), are based on different orientation parameters, are computed for different parts of the suspect signal, or are based on different attributes of the watermark.

The features evaluated in each stage need not be measures of correlation. For example, one stage may evaluate the similarity between a decoded symbol or symbols from the suspect signal and symbol or symbols expected to be in a watermark message. A statistical analysis may be employed to indicate the likelihood that the decoded symbols represent expected symbols. Based on the similarity measure and/or statistical likelihood, the detection stage provides a detection value that can be combined with a detection value derived from another detection stage. In sum, effective detection metrics may be constructed by combining information from different stages. These detection metrics can then be used to control detector action, such as rejected unmarked signals or focusing further detection on portion of the suspect signal that appear more likely to have a valid, recoverable watermark.

Concluding Remarks

Having described the principles of my invention with reference to an illustrative embodiment, it should be apparent that the invention can be modified in arrangement and details without departing from such principles. Accordingly, I claim as my invention all such embodiments as may come within the scope and spirit of the following claims, and equivalents thereto.

To provide a comprehensive disclosure without unduly lengthening the specification, applicant incorporates by reference any patents and patent applications referenced above.

The particular combinations of elements and features in the above-detailed embodiments are exemplary only; the interchanging and substitution of these teachings with other teachings in this and the incorporated-by-reference patents/applications are also contemplated.

We claim:

1. A method of using detection values computed from a signal suspected of being watermarked to control watermark detection, the method comprising:

computing detection values for two or more candidate watermark signals in a suspect signal, where each detection value corresponds to a metric indicating likelihood of a watermark signal in the suspect signal, the watermark signal being detected comprises a set of attributes embedded at locations within the suspect signal, and catch detection value is a measure of the set of attributes;

computing a relative detection value based on an analysis of two or more of the detection values relative to each other, and controlling detector action based on the relative detection value.

2. The method of claim 1:

including computing an absolute detection value for at least one candidate watermark signal in the suspect signal; and controlling detector action based at last in part on the absolute and relative detection values.

3. The method of claim 2 wherein the detector action comprises screening unmarked signals from further detection action.

4. The method of claim 1 including determining whether to reject a suspect signal as being un-marked by comparing the relative detection value to a limit.

5. The method of claim 1 including determining whether to reject at least a portion of the suspect signal as being un-marked by two or more screening stages, where a first screening stage tests a set of candidate watermark signals; and a subsequent screening stage tests candidate watermark signals that remain after the first screening stage.

6. The method of claim 1 including selecting additional candidate watermark signals in the suspect signal based on the detection values; and computing detection values for the additional candidates in an attempt to find candidates that evince a stronger watermark signal.

7. The method of claim 6 wherein selecting additional candidate watermark signals comprises refining orientation parameters associated with the candidate watermark signals.

8. The method of claim 1 wherein the detection values comprise measures of correlation between a calibration signal and at least portions of the suspect signal.

9. The method of claim 1 wherein the detection values comprise a measure of similarity between an expected calibration signal and a calibration signal decoded from at least a portion of the suspect signal.

10. The method of claim 1 wherein the relative detection value is used as an indicator of strength of a watermark in the suspect signal.

11. The method of claim 1 wherein the relative detection value is used to control use, copying or recording of the suspect signal.

12. The method of claim 1 wherein the relative detection value is used to determine whether the suspect signal has been tampered with.

13. A computer readable medium on which is stored software for performing the method of claim 1.

14. The method of claim 1 wherein the detection values comprise measures of correlation.

15. The method of claim 14 wherein the relative detection value comprises a comparison of a top correlation measure with one or more lesser correlation measures.

16. A method of using detection values computed from a signal suspected of being watermarked to control watermark detection, the method comprising:

computing detection values for two or more candidate watermark signals in a suspect signal, where each detection value corresponds to a metric indicating likelihood of a watermark signal in the suspect signal, the watermark signal being detected comprises a set of attributes embedded at locations within the suspect signal;

computing a relative detection value based on an analysis of two or more of the detection values relative to each other, and controlling detector action based on the relative detection value;

where the candidate watermark signals have corresponding orientation parameters describing orientations of the candidate watermark signals in the suspect signal.

17. The method of claim 16 wherein the candidate watermark signals are each represented by one or more orientation parameters that approximate a spatial or temporal transform that at least a portion of the suspect signal has undergone subsequent to being encoded with a watermark.

18. A method of detecting a watermark having a set of attributes embedded at locations within a suspect signal, the method comprising:

computing detection values for two or more watermark signal candidates in the suspect signal;

evaluating a first detection metric based on the detection values;

evaluating a second detection metric based on the detection values; and controlling further detector actions based on the first and second detection metrics; wherein at least one of the metrics uses criteria indicating whether a valid watermark signal is present that adapts to the suspect signal according to detection values computed from the suspect signal; and wherein the detection values are each computed as a measure of the set of attributes of the watermark.

19. The method of claim 18 wherein the detection metrics comprise first and second screening stages and the second screening stage screens candidate watermark signals that remain after the first screening stage.

20. The method of claim 19 wherein each stage screens candidate watermark signals in a suspect signal deemed to be un-marked.

21. The method of claim 18 wherein each of the detection stages perform one or more of the following:

comparing a top detection value to a limit, and comparing a top detection value to a one or more lesser detection values or combination of lesser detection values.

22. The method of claim 18 wherein the detection values are computed for candidate watermark signals and the first and second detection metrics are used as an indicator of strength of a watermark in the suspect signal.

23. The method of claim 22 wherein the strength of the watermark is used to determine whether the suspect signal has been transformed.

24. The method of claim 22 wherein the strength of the watermark is used to control use, recording or copying of the suspect signal.

25. The method of claim 18 wherein the detection values are computed for candidate watermark signals and the first and second detection metrics are used to control use, recording or copying of the suspect signal.

26. A computer readable medium on which is stored software for performing the method of claim 18.

27. The method of claim 18 wherein the detection values comprise measures of correlation and at least one of the detection metrics comprises an evaluation of relative correlation measures for different candidate watermark signals.

28. The method of claim 27 wherein the evaluation includes comparing a top correlation measure with one or more lesser correlation measures.

29. A method of watermark detection in a signal suspected of being watermarked comprising:

computing two or more features of a suspect signal from different stages of watermark detection; and combining information from the two or more features to control watermark detector action; wherein at least one feature provides a measure of watermark signal validity of a watermark signal candidate relative to other watermark signal candidates; and the at least one feature comprises a comparison of a top detection value of a watermark signal candidate with lesser detection values of other watermark signal candidates.

30. The method of claim 29 wherein the detector action is screening an unmarked signal.

31. The method of claim 29 wherein the two or more features comprise different measures of correlation.

32. The method of claim 29 wherein the two or more features comprise independent detection values.

33. The method of claim 29 wherein the detector action is a subsequent detection stage.

34. A computer readable medium on which is stored software for performing the method of claim 29.

35. The method of claim 29 wherein the detection values comprise correlation values.

36. The method of claim 29 wherein a watermark being detected comprises a set of attributes embedded at locations within the signal suspected of being watermarked.

37. The method of claim 36 wherein the detection values comprise correlation values.

* * * * *

UNITED STATES PATENT AND TRADEMARK OFFICE
CERTIFICATE OF CORRECTION

PATENT NO. : 6,516,079 B1
DATED : February 4, 2003
INVENTOR(S) : Rhoads et al.

It is certified that error appears in the above-identified patent and that said Letters Patent is hereby corrected as shown below:

Title page,
Item [56], References Cited, U.S. PATENT DOCUMENTS, add the following:

| | | |
|---|---|---|
| -- 09/503,881 | 2/14/00 | Rhoads et al. |
| 5,859,920 | 1/12/99 | Daly et al. |
| 5,905,819 | 5/18/99 | Daly |
| 5,940,135 | 8/17/99 | Petrovic et al. |
| 5,940,429 | 8/17/99 | Lam et al. |
| 5,945,932 | 8/31/99 | Smith et al. |
| 6,031,914 | 2/29/00 | Tewfik et al. |
| 6,035,177 | 3/7/00 | Moses et al. |
| 6,044,156 | 3/28/00 | Honsinger et al. |
| 6,061,793 | 5/9/00 | Tewfik et al. |
| 6,078,664 | 6/20/00 | Moskowitz et al. |
| 6,122,403 | 9/19/00 | Rhoads |
| 6,181,802 | 1/30/01 | Todd |
| 6,219,634 | 4/17/01 | Levine --. |

FOREIGN PATENT DOCUMENTS, add the following:

| | | |
|---|---|---|
| -- WO96/21290 | 7/1/96 | Best |
| WO97/33392 | 9/12/97 | Todd |
| WO98/53565 | 11/26/98 | Petrovic |
| WO00/00969 | 1/6/00 | Petrovic |
| WO00/22745 | 4/20/00 | Lee --. |

UNITED STATES PATENT AND TRADEMARK OFFICE
CERTIFICATE OF CORRECTION

PATENT NO. : 6,516,079 B1
DATED : February 4, 2003
INVENTOR(S) : Rhoads et al.

It is certified that error appears in the above-identified patent and that said Letters Patent is hereby corrected as shown below:

OTHER PUBLICATIONS, add the following:
-- Haitsma et al., "Audio Watermarking for Monitoring and Copy Protection," ACM Multimedia workshop Marina Del Rey, CA, ACM 2000 1-58113-311-1/00/11, pp. 119-122.
Honsinger et al., "Data Embedding Using Phase Dispersion," 2000 Eastman Kodak Company, 9 pages. --

Column 9,
Line 24, change "catch" to -- each --.

Signed and Sealed this

Twenty-eighth Day of October, 2003

JAMES E. ROGAN
*Director of the United States Patent and Trademark Office*